March 17, 1959  B. G. PRICE ET AL  2,878,447
APPARATUS FOR INSPECTING FERROMAGNETIC MEMBERS
Filed April 3, 1957  3 Sheets-Sheet 1
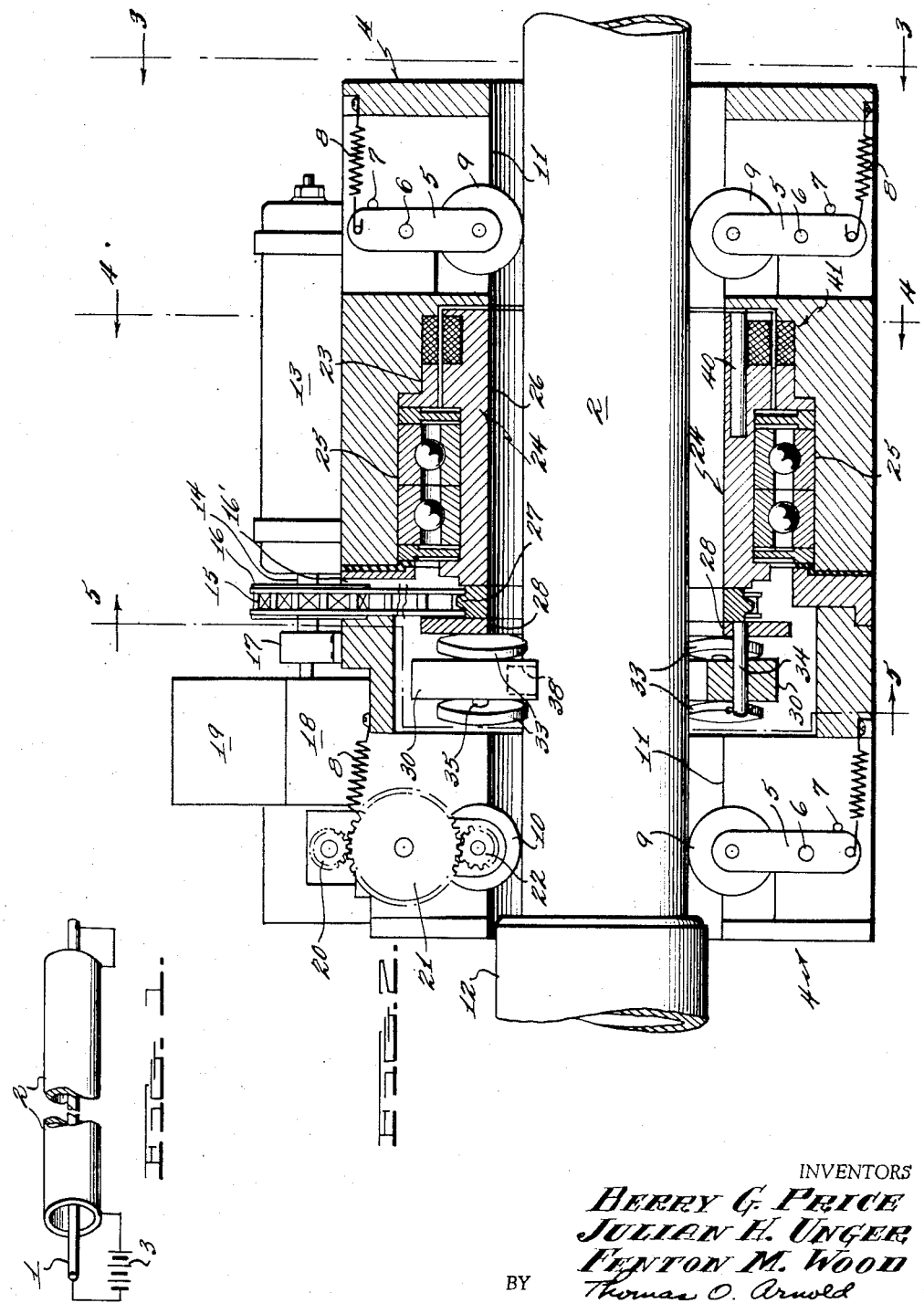
INVENTORS
BERRY G. PRICE
JULIAN H. UNGER
FENTON M. WOOD
BY Thomas O. Arnold
Melvin R. Stidham
ATTORNEYS

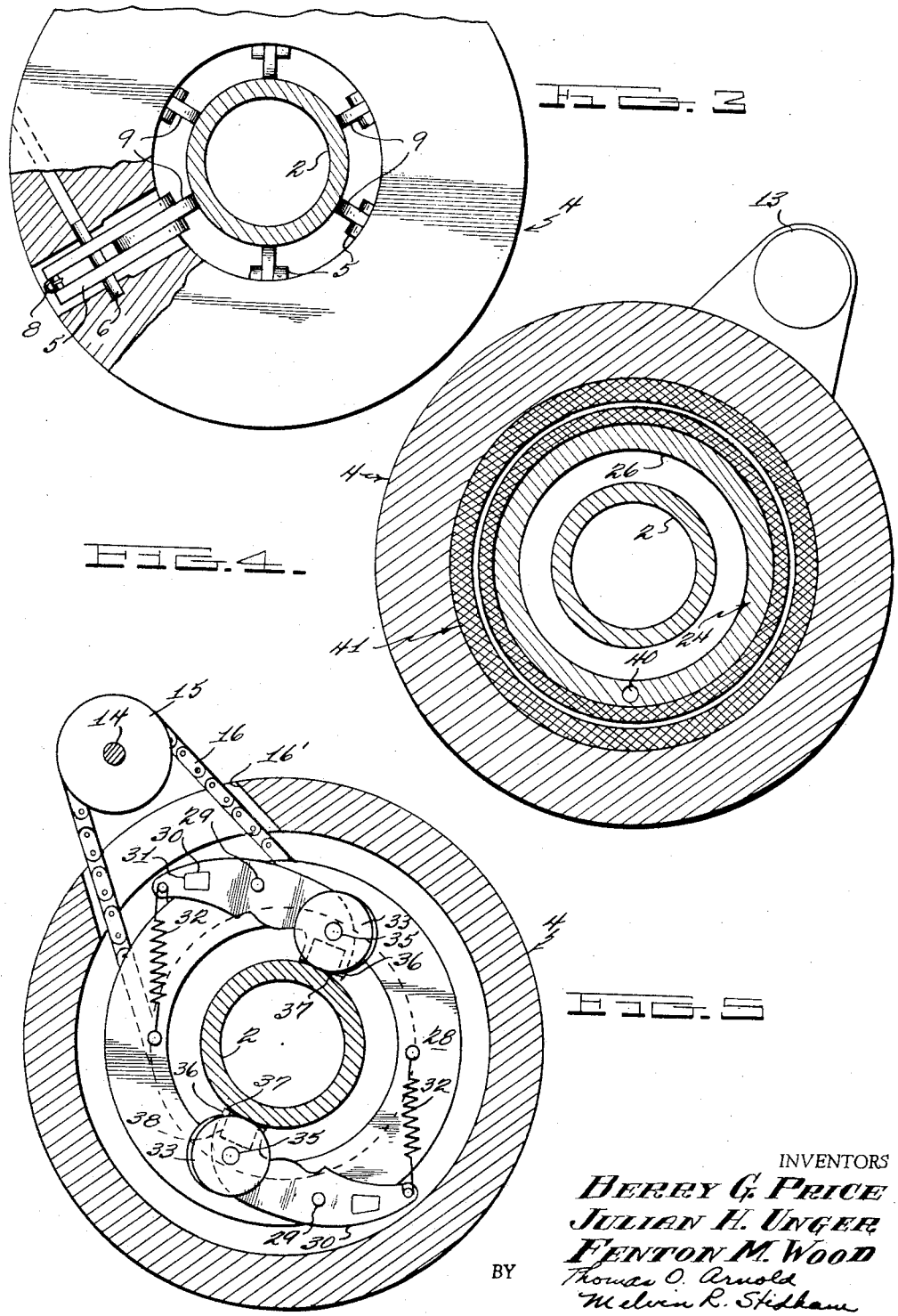

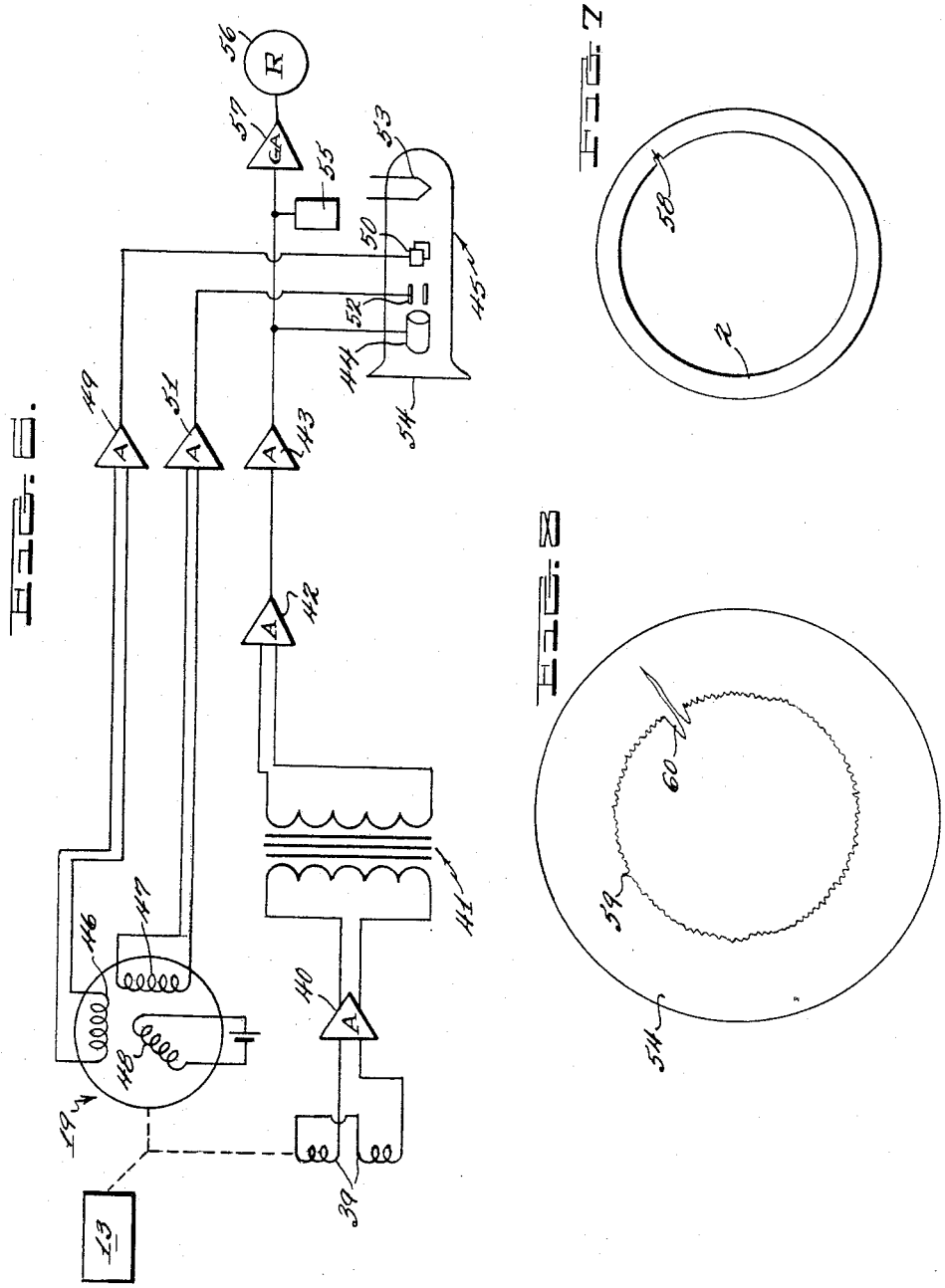

United States Patent Office 2,878,447
Patented Mar. 17, 1959

2,878,447
APPARATUS FOR INSPECTING FERROMAGNETIC MEMBERS

Berry G. Price, Julian H. Unger, and Fenton M. Wood, Houston, Tex., assignors to Tuboscope Company, Harris County, Tex., a corporation of Delaware Application April 3, 1957, Serial No. 650,440

7 Claims. (Cl. 324—37)

This invention relates to magnetic testing and particularly to an improved apparatus for the magnetic detection, location and measurement of flaws or defects in tubular ferromagnetic goods such as pipe, well casing and the like. The apparatus of the present invention is particularly useful in carrying out the method disclosed in our copending application Serial Number 650,418, filed concurrently herewith.

As disclosed in detail in said copending application, it is common practice to carry out non-destructive testing of tubular ferromagnetic goods by circumferentially magnetizing the ferromagnetic goods and scanning the goods to detect distortions of the circumferential magnetic field caused by flaws or defects. Said copending application describes a particularly advantageous method for establishing the magnetic field circumferentially of the tubular goods to be tested, such method involving the passing of electrical current simultaneously through both the tubular member itself and a conductor extending longitudinally within the tubular member, with the current flowing in opposite directions in the conductor and the tubular member. Whether this particular improved method of magnetization is employed, or whether the magnetization is accomplished by a more conventional procedure, it is often the practice to scan the exterior surface of the tubular goods by means of a magneto-responsive device, such as a pick-up coil, disposed adjacent the outer surface of the tubular goods and moved therealong in a helical path. While numerous types of apparatus have been proposed for carrying out the scanning step, none have been entirely satisfactory.

An object of the present invention is to provide an improved apparatus capable of carrying out such a scanning operation.

A further object of the invention is to provide such apparatus including a magneto-responsive device, such as a pick-up coil, in combination with novel means for positioning the magneto-responsive device closely adjacent to the outer surface of the tubular goods being tested and moving such device along said outer surface in a smooth and positive manner without undue wear occurring in the parts associated with the magneto-responsive device.

Another object of the invention is to provide such an apparatus which is not only capable of effectively carrying out the scanning operation but which also embodies in a single unitary, mobile structure certain electrical components necessary to develop an electrical indication of the existence of a flaw in the tubular goods being inspected.

A further object of the invention is to provide such an apparatus embodying electrical means responsive to operation of the pickup coil, or equivalent magneto-responsive device, for developing a graphical representation not only of any flaw or discontinuity detected by the pickup coil but also of the path of travel of the pickup coil about the member being inspected, with the representation of the flaw or discontinuity being properly oriented on the representation of the path of travel of the pickup coil.

In order that these and other objects of the invention may be understood in detail, reference is had to the accompanying drawings, which form a part of this specification, and wherein:

Fig. 1 is a schematic diagram illustrating the manner in which a tubular member to be inspected by means of the apparatus of the invention can be circumferentially magnetized;

Fig. 2 is a longitudinal sectional view, with some parts shown in elevation, of one embodiment of the scanning apparatus of the present invention;

Fig. 3 is a transverse sectional view taken on line 3—3, Fig. 2;

Fig. 4 is a transverse sectional view taken on line 4—4, Fig. 2;

Fig. 5 is a transverse sectional view taken on line 5—5, Fig. 2;

Fig. 6 is a simplified wiring diagram of one form of detecting, measuring and indicating apparatus of which the scanning means of the present invention may form a part;

Fig. 7 is a cross-sectional view of a pipe having a typical defect which can be measured and detected in accordance with the invention, and Fig. 8 is a view illustrating the manner in which the presence and radial position and size of the defect in the pipe of Fig. 7 is indicated in accordance with the invention.

As seen in Fig. 1, the circumferential magnetic field necessary for use of the present apparatus can be established by placing an elongated conductor 1 longitudinally within the tubular goods 2 to be inspected, connecting one end of the conductor to the adjacent end of the tubular goods and connecting the other end of the conductor to the remaining end of the tubular goods through a source of direct current 3. Thus, current from source 3 passes in one direction through conductor 1 and, simultaneously, in the opposite direction through the tubular member 2 to be inspected.

The magnetizing effect of the current passed through the wall of tubular member 2 is maximum at the outer surface of the tubular member and zero, or substantially zero, at the inner surface thereof. On the other hand, the magnetizing effect of the current passing through the conductor 1 is large at the inner surface of tubular member 2 and small at the outer surface thereof. The combined effects of the two currents provide a maximum magnetizing force at the inner surface of the tubular member, and a minimum magnetizing force at the outer surface thereof. By making the two currents equal, the magnetizing force at the outer surface of the tubular member is thus made zero. Thus, the resulting circumferential magnetic field has a flux density which is maximum at the inner surface of the tubular member, minimum or zero at the outer surface thereof, and varies substantially as the square of the distance from the outer surface.

Referring now to Fig. 2, it will be seen that the apparatus of the present invention is designed to traverse the outer surface of the tubular member 2 and comprises a tubular carriage 4 embracing the tubular member 2 and provided at each end with a plurality of radially extending arms 5 mounted on pivot pins 6 for movement in planes radial with respect to the tubular member 2. Arms 5 are prevented from pivoting in one direction by stops 7 and are urged into contact with such stops by springs 8. At one end of carriage 4, the arms 5 are all provided with idler wheels 9 which engage the outer surface of member 2 in free-rolling relationship. At the other end of carriage 4, one of the arms 5 is provided with a traction or driving wheel 10, the remainder of the arms at this end of the carriage being provided with idler wheels.

Arms 5, springs 8 and stops 7 cooperate to maintain the wheels 9 and 10 in engagement with member 2, the arrangement being such that the carriage is positioned with its inner wall 11 concentric with tubular member 2. The carriage is driven by traction wheel 10 in such fashion that the arms 5 are allowed to pivot rearwardly with respect to the direction of travel, so that the wheels can thus negotiate a coupling 12 or other irregularity in the tubular member 2 being traversed by the device.

Carriage 4 is powered by a suitable electric motor 13 mounted directly on the carriage in any suitable fashion and having a driving shaft 14 extending longitudinally of the carriage. Adjacent the motor, shaft 14 carries a sprocket 15 engaged with a timing chain 16 for the purpose hereinafter explained. Beyond sprocket 15, shaft 14 is supported in a suitable bearing 17 and, beyond the bearing, is connected to drive a gear box 18 and a resolver 19. The output of gear box 18 is connected to drive gears 20, 21, and 22 and so rotate the traction wheel 10 to travel the carriage along tubular member 2.

Centrally of its main body, the carriage 4 is provided with a recess 23 of circular transverse cross-section in which is mounted a tubular rotor 24. The rotor 24 is mounted for rotation, both with respect to the carriage 4 and the tubular member 2 being inspected, by ball bearings 25 disposed exteriorly of the rotor. Rotor 24 has a cylindrical inner surface 26 spaced from the tubular member 2 and disposed concentrically with respect thereto. At its forward end, the rotor carries a sprocket wheel 27 engaged with timing chain 16, so that the rotor turns about the axis of tubular member 2 whenever motor 13 is operating. As best seen in Fig. 5, the carriage 4 is provided with a radial opening 16' disposed between shaft 14 and rotor 24 and through which the chain 16 extends.

Also at its forward end, rotor 24 carries a fixed flange plate 28 disposed in a transverse plane lying at right angles to the axis of tubular member 2. Pivoted to the forward face of flange plate 28, at diametrically opposed points 29, are two arms 30, both arms 30 being arranged for movement in a transverse plane parallel to flange plate 28, as will be clear from Figs. 2 and 5. At their outer ends, the arms 30 are provided with weights 31 so that, as rotor 24 rotates, centrifugal force causes the arms 30 to pivot in a direction such that the inner ends of the arms approach the tubular member 2. Arms 30 are biased against such movement by springs 32, the strength of the springs being made such as to allow the biasing force of the springs to be overcome by the centrifugal force resulting, as rotor 24 turns, from the combined weight of the outer arm portions and the counterweights 31. At both sides of the inner end of each arm 30, wheels 33 are mounted for free rolling contact with the outer surface of tubular member 2, as will be clear from Figs. 2 and 5.

While arms 30, being pivoted on longitudinally disposed pins 34 fixed in flange plate 28, are mounted for movement in a plane at right angles to the axis of tubular member 2, the axles 35 for wheels 33 are set slightly askew, so that the wheels are disposed at a slight angle, say 6°, to the face of plate 28. Thus, as rotor 24 turns, the wheels 33 traverse a helical path along the surface of the tubular member 2. As will be seen, this helical path is the path along which the apparatus scans the tubular member being inspected. Further, the slight angle at which wheels 33 are set assures that the wheels will climb any irregularities in the tubular member 2 as, for example, the shoulder presented by coupling 12.

From Fig. 5, it will be observed that the inner end portions 36 of arms 30 are maintained out of contact with tubular member 2 by reason of the disposition of wheels 33. However, inner end portions 36 of the arms 30 have faces 37 disposed very close to the outer surface of the tubular member when wheels 33 are in contact with the tubular member. Opening through each such face 37 in arms 30 are cavities 38 in which are mounted the pickup or detector coils 39, Fig. 6, of the electrical detecting and indicating system of the apparatus. Thus, when arms 30 are in the position illustrated in Fig. 5, the coils 39, forming the magneto-responsive means of the invention, are disposed closely adjacent to the outer surface of the tubular member 2 being inspected, that is, in scanning position.

In operation of the mechanical portion of the apparatus illustrated in Figs. 2–5, the carriage 4 is advanced axially along tubular member 2 by the action of traction wheel 10. In this connection, it will be understood that wheel 10 engages the outer surface of tubular member 2 in such fashion as to provide the desired driving force, and that the periphery of wheel 10 may be serrated or provided with any suitable friction facing. As the carriage 4 advances, rotor 24 is rotated continuously, by action of the timing chain 16, so that arms 30 are similarly rotated and, by centrifugal force, urged against the biasing action of springs 32 to the positions indicated in Fig. 5, with detector coils 39 disposed closely adjacent to the outer surface of the tubular member 2. Since rotor 24 is turning as the carriage advances, coils 39 follow a helical path about the tubular member.

The coils 39 constitute magneto-responsive means for developing a signal when one of the coils scans a portion of tubular member 2 containing a flaw and, as will now be explained with reference to Figs. 6–8, the present invention converts such signal to a visible indication of the radial position and dimension of the flaw. As seen in Fig. 6, the coils 39 are connected to a conventional signal amplifier 40 which amplifies the signal voltage from the coils and applies the amplified voltage across the primary winding of a transformer 41. Since a small amount of noise is generated in the transformer, it is advantageous to employ the signal amplifier 40 in order to preserve the signal-to-noise ratio existing at the detector coils, it being understood that this ratio is a highly desirable one attainable because of the special method of magnetization hereinbefore described. Advantageously, both the signal amplifier 40 and the transformer 41 are mounted within carriage 4, the amplifier and the primary of the transformer being carried by rotor 24 and the secondary winding of the transformer being carried by the stationary body of the carriage, as shown in Fig. 2. The secondary winding of transformer 41 is connected, through additional signal amplifiers 42 and 43, to the radial deflection electrode 44 of a cathode ray tube 45.

The resolver 19 advantageously comprises two stationary coils 46 and 47 disposed at right angles to each other, and a rotatable coil 48 disposed equidistant from the two stationary coils. The rotatable coil 48 is driven, from motor 13 via gear box 18, in such fashion that the rotatable coil makes one turn for each turn of rotor 24 about the tubular member 2 being inspected. Accordingly, during operation of the device, voltages are induced in stationary coils 46 and 47 which are representative of the rotational position of rotor 24, and thus of the detector coils 39. The stationary coil 46 is connected, via amplifier 49, to the horizontal deflection plates 50 of the cathode ray tube. Similarly, stationary coil 47 is connected, via amplifier 51, to the vertical deflection plates 52 of the cathode ray tube.

In the cathode ray tube 45, an electron beam is generated by cathode 53 and passes to the screen 54 of the tube, causing a spot to be displayed on the screen. The electron beam is continuously deflected, during operation of the device, by the changing charges on deflection plates 50 and 52. Since the charges on the deflection plates 50 and 52 depend upon voltages induced as a result of rotation of coil 48 of resolver 19, the variations on these charges are such that the spot displayed on the cathode ray tube screen 54 moves circumferentially about the screen, such movement being truly representative of the movement of the detector coils 39 about the tubular member 2 being inspected.

When the signal coils 39 scan a portion of member 2 containing a flaw, a corresponding signal voltage is generated in the detector coils and this voltage, after amplification, is applied to the radial deflection electrode 44 of the cathode ray tube. Occurrence of such signal voltage will cause the spot displayed on the cathode ray tube screen to be deflected radially from its circumferential course. Since, at this time, the spot is moving in substantial synchronism with the detector coils, the deflection resulting because of the flaw-promoted signal voltage will occur at a point on the screen 54 which is representative of the radial position of the flaw in the tubular member 2. Since any flaw-promoted signal occurring in the detector coils is approximately in inverse square function of the distance between the detector coils, located substantially at the outer surface of the tubular member 2, and the flaw, and since the special method of magnetization employed in the invention establishes a magnetic field in which the flux density increases as the square of the distance from the outer surface of the tubular member, the magnitude of the deflection of the spot on the cathode ray tube screen resulting because of the flaw-promoted signal will be proportional to the size of the flaw.

In order to brighten the indication on the cathode ray tube screen, an intensifier 55, responding to the signal from the detector coils, is employed.

Also responsive to the signal from detector coils 39 is a galvanometer recorder 56 provided to record the position and size of any flaws encountered. The recorder 56 is advantageously of the strip record type. In order to provide an indication on the recording chart of the radial position of the flaw, a predetermined signal is applied to the recorder to actuate the recording stylus to make a reference mark each time the deflector coils complete one turn about the tubular member 2. The flaw-promoted signals, being applied to the recorder via galvanometer amplifier 57, are recorded in proper space relation to such reference marks, so that both size and position can be read.

In the graphical illustration of operation of the system of Fig. 6 to give a visible indication of the size and radial position of a flaw, seen in Figs. 7 and 8, it is assumed that the tubular member 2 contains a flaw 58, Fig. 7, located at its inner surface. As the detector coils 39 approach the location of flaw 58, the spot displayed on the screen of the cathode ray tube will be following a relatively steady circumferential course, as seen at 59, Fig. 8. As the detector coils scan the area of tubular member 2 containing the flaw, the resulting signal voltage applied to the radial deflection electrode of the cathode ray tube will cause the spot to be deflected from its normal circumferential course, giving the indication seen at 60, Fig. 8. As will be seen by comparing Figs. 7 and 8, the radial position of the flaw 58 is accurately represented by the indication 60. The magnitude of the displacement causing indication 60 is proportional to the size of the flaw, as hereinbefore explained.

If desired, an indication of existence of a flaw can also be obtained by replacing the recorder 56 with a galvanometer, the operator noting the occurrence of a deflection of the galvanometer when a flaw-promoted signal occurs, and simultaneously observing the position of the carriage 4 on the tubular member 2 when such deflection occurs, in order to determine the position of the flaw.

The amplifiers 40, 42, 43, 49 and 51, the intensifier 55, the recorder 56 and the galvanometer amplifier 57 are of conventional construction and have been illustrated only diagrammatically for purposes of simplicity. While one preferred embodiment of the apparatus employed in the present invention has been illustrated, it will be understood that many modifications can be made therein without departing from the scope of the appended claims.

We claim:

1. In an apparatus for magnetically inspecting an elongated ferromagnetic member having a cylindrical outer surface, the combination of a carriage having a longitudinal bore adapted to freely receive the member to be inspected in order that the carriage can travel along such member, supporting means carried by said carriage and including a plurality of wheels disposed for contact with the outer surface of the member to be inspected, one of said wheels constituting a traction wheel for driving said carriage, the bore of said carriage including an annular recess disposed transversely of the bore intermediate the ends thereof, a tubular rotor disposed within said recess coaxial with said bore and having an inner diameter of sufficient size to freely receive the member to be inspected, bearing means disposed between said rotor and the wall of said recess and mounting said rotor for rotation relative to said carriage about the axis of said bore, magneto-responsive means carried by said rotor for scanning the member to be inspected as the rotor rotates during travel of the carriage, a driving motor mounted on said carriage and having a driving shaft extending parallel to said bore, said carriage including an opening between said shaft and said rotor, means extending through said opening and connecting said shaft to drive said rotor, and means connecting said shaft to drive said traction wheel.

2. In an apparatus for magnetically inspecting an elongated ferromagnetic member having a cylindrical outer surface, the combination of a carriage having a longitudinal bore adapted to freely receive the member to be inspected in order that the carriage can travel along such member, supporting means carried by said carriage and including a plurality of wheels disposed for contact with the outer surface of the member to be inspected, one of said wheels constituting a traction wheel for driving said carriage, the bore of said carriage including an annular recess disposed transversely of the bore intermediate the ends thereof, a tubular rotor disposed within said recess coaxial with said bore and having an inner diameter of sufficient size to freely receive the member to be inspected, bearing means disposed between said rotor and the wall of said recess and mounting said rotor for rotation relative to said carriage about the axis of said bore, said recess providing an annular space at one end of said rotor, an arm disposed in said space transversely of the carriage, means pivotally mounting said arm at a point intermediate its length to said rotor for pivotal movement in a plane transverse to said bore, one end of said arm including counterweight means to effect such pivotal movement by centrifugal force as the rotor turns, magneto-responsive means mounted on the other end of said arm in position to be brought into scanning relation to the member to be tested when said arm is so pivoted by centrifugal force, a driving motor mounted on said carriage and including a driving shaft extending parallel to said bore, said carriage including an opening disposed between said shaft and said rotor, means extending through said opening and connecting said shaft to drive said rotor, and means connecting said shaft to drive said traction wheel.

3. In an apparatus for magnetically inspecting an elongated ferromagnetic member having a cylindrical outer surface, the combination of a generally tubular carriage body having an internal diameter larger than the diameter of the member to be inspected, a tubular rotor mounted within said carriage body for rotation with respect thereto about the axis of said body, said rotor having an inner diameter of such size as to freely receive the member to be tested, an arm arranged transversely within said carriage body and pivotally mounted at a point intermediate its ends on said rotor for movement in a plane transverse to the axis of said carriage body, one end of said arm constituting counterweight means whereby the other end of said arm is pivoted toward the member to be inspected as the rotor rotates, resilient means connected to said arm and biasing the same against the pivotal movement so caused by centrifugal force, magneto-responsive means mounted on said other end of said arm and disposed to be brought into scanning relationship with the outer surface of the member to be tested when said other end of said arm is pivoted toward said member, supporting means carried by said carriage body and including a plurality of wheels disposed to contact the outer surface of the member being tested, one of said wheels constituting a traction wheel for driving said carriage, a driving motor mounted on said carriage exteriorly thereof and including a drive shaft extending parallel to the axis of said carriage body, said carriage body being provided with an opening between said drive shaft and said rotor, means extending through said opening and connecting said shaft to drive said rotor, and means connecting said shaft to drive said traction wheel.

4. In an apparatus for magnetically inspecting an elongated ferromagnetic member having a generally cylindrical outer surface, the combination of a carriage having a longitudinal bore adapted to freely receive the member to be tested in order that the carriage can travel therealong, supporting means carried by said carriage and including a plurality of wheels disposed for rolling contact with the outer surface of the member to be inspected, one of said wheels constituting a traction element for driving said carriage, a tubular rotor mounted within said carriage and axially aligned with the bore thereof, said rotor being mounted for rotation about its longitudinal axis with respect to said carriage, magneto-responsive means carried by said rotor and adapted to scan the member to be inspected as the rotor rotates during travel of the carriage, a driving motor mounted on said carriage and having a driving shaft extending parallel to the bore of said carriage, said carriage including an opening disposed between said rotor and said shaft, means extending through said opening and connecting said shaft to drive said rotor, means connecting said shaft to drive said traction element and an electrical circuit connected to said magneto-responsive means and including signal means responsive to voltages developed in said magneto responsive means, said circuit including a transformer connected between said magneto-responsive means and said signal means and having a primary winding and a secondary winding, one of said windings being mounted on said rotor and the other of said windings being mounted on said carriage.

5. In an apparatus for magnetic inspection of an elongated ferromagnetic member of the type including a mobile unit adapted to travel the member to be inspected and having a pickup coil adapted to magnetically scan the member, and electrical means constructed to respond to signal voltages developed in said pickup coil, the combination of a generally tubular carriage for the mobile unit, a tubular rotor disposed within said carriage and axially aligned therewith, said rotor being mounted for rotation about its longitudinal axis relative to said carriage and said pickup coil being mounted on said rotor, indicating means connected in said electrical means, and a transformer connected in said electrical means between said pickup coil and said indicating means, said transformer including a primary winding and a secondary winding, said primary winding being mounted on said rotor and said secondary winding being mounted on said carriage.

6. In an apparatus for magnetic inspection of an elongated ferromagnetic member, said apparatus being of the type including a mobile unit adapted to travel the member to be inspected and having a pickup coil for scanning the member magnetically, and electrical means constructed to respond to signal voltages developed in said coil, the combination of a generally tubular carriage for the mobile unit, a tubular rotor disposed within said carriage and axially aligned therewith, said rotor being mounted for rotation about its longitudinal axis relative to said carriage and the pickup coil being mounted on said rotor, a cathode ray tube connected in said electrical means and having a radial deflection electrode and horizontal and vertical deflection electrodes, said electrical means including a circuit connecting said pickup coil to said radial deflection electrode through a transformer having two windings, one of said windings being mounted on said rotor and the other being mounted on said carriage, a motor mounted on said carriage, means connecting said motor to drive said rotor, a resolver mounted on said carriage and including a rotary coil and two stationary coils operatively associated therewith, and means connecting said motor to drive said rotary coil, said electrical means including circuit means connecting one of said stationary coils to said horizontal deflection electrode and the other to said vertical deflection electrode.

7. In an apparatus for magnetic inspection of an elongated ferromagnetic member, the combination of a mobile unit adapted to travel the member to be inspected, said unit including a tubular rotor capable of freely receiving the member to be inspected, means for rotating said rotor during the travel of the mobile unit, and a magnetic pickup head carried by said rotor and adapted to scan the member to be inspected; a cathode ray tube having a screen, a radial deflection electrode and horizontal and vertical deflection electrodes; means actuated in response to rotation of said rotor and connected to said horizontal and vertical deflection electrodes to establish on the screen of said cathode ray tube a circular image representative of the path of travel of said rotor, and therefore said pickup head, about the member to be tested; and circuit means connecting said pickup head to the deflection electrode of said cathode ray tube to modify such image in response to signal voltages developed in said pickup head.

References Cited in the file of this patent

UNITED STATES PATENTS

| | | |
|---|---|---|
| 2,519,367 | Gunn et al. | Aug. 22, 1950 |
| 2,629,004 | Greenough | Feb. 17, 1953 |
| 2,684,464 | Hastings et al. | July 20, 1954 |
| 2,685,672 | Price et al. | Aug. 3, 1954 |